United States Patent [19]

Ballard

[11] Patent Number: 5,515,456
[45] Date of Patent: May 7, 1996

[54] PROCESS FOR PROVIDING DIGITAL HALFTONE IMAGE WITH RANDOM ERROR DIFFUSION, COLOR CORRECTION AND ENLARGEMENT

[75] Inventor: Eugene R. Ballard, San Jose, Calif.

[73] Assignee: Visual Edge Technology, Inc., Sunnyvale, Calif.

[21] Appl. No.: 141,092

[22] Filed: Oct. 26, 1993

[51] Int. Cl.$^6$ ........................................ G06K 9/38
[52] U.S. Cl. ................ 382/252; 382/270; 358/457
[58] Field of Search .................. 382/50, 53, 22, 382/54, 199, 270, 273, 254, 251, 252; 358/454, 456, 455, 463, 465

[56] References Cited

U.S. PATENT DOCUMENTS

| | | | |
|---|---|---|---|
| 4,955,065 | 9/1990 | Ulichney | 358/456 |
| 5,045,952 | 9/1991 | Eschbach | 358/455 |
| 5,051,841 | 9/1991 | Bowers et al. | 358/447 |
| 5,060,284 | 10/1991 | Klees | 358/465 |
| 5,068,914 | 11/1991 | Klees | 382/54 |
| 5,077,615 | 12/1991 | Tsuji | 358/456 |
| 5,107,346 | 4/1992 | Bowers et al. | 358/447 |
| 5,130,823 | 7/1992 | Bowers | 358/465 |
| 5,309,254 | 5/1994 | Kuwabara et al. | 358/456 |

OTHER PUBLICATIONS

Robert Ulichney, "Digital Halftoning", 1987, MIT Press, pp. 268–279.

Primary Examiner—Joseph Mancuso
Assistant Examiner—Gerard Del Rosso
Attorney, Agent, or Firm—Burns, Doane, Swecker & Mathis

[57] ABSTRACT

An error diffusion process includes the steps of: processing an image comprising a plurality of pixels by determining intensity values for each of the pixels; and performing one weight error diffusion for each pixel. The one-weight error diffusion process includes the steps of: encoding an intensity value as a first binary value for each pixel when the determined intensity is less than a predetermined threshold value, and as a second binary value when the determined intensity is greater than the predetermined threshold value, calculating an error value corresponding to the difference between the intensity value and a predetermined value, selecting a pixel either at a first location relative to the pixel presently being processed or a second location relative to the pixel presently being processed, adjusting an intensity value of the selected pixel according to the error value, and performing the error diffusion step for a next pixel value.

10 Claims, 3 Drawing Sheets

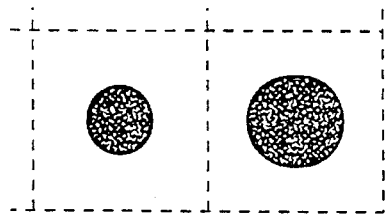
FIG._1A
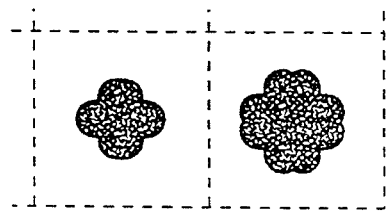
FIG._1B
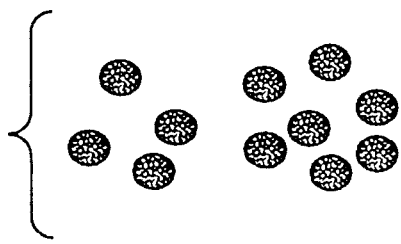
FIG._1C
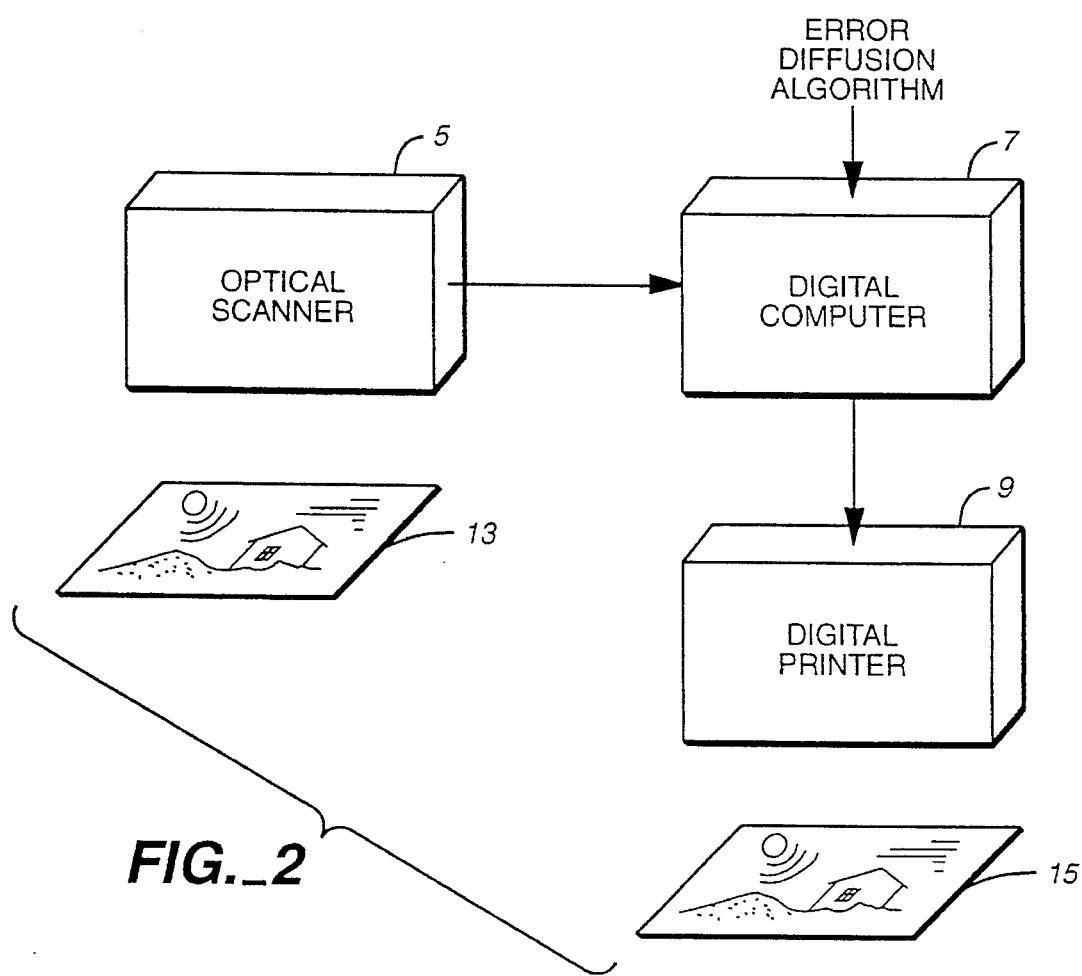
FIG._2

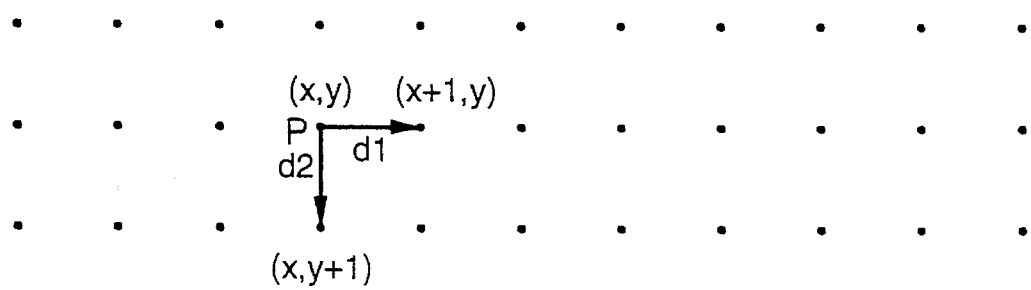
ODD ROWS
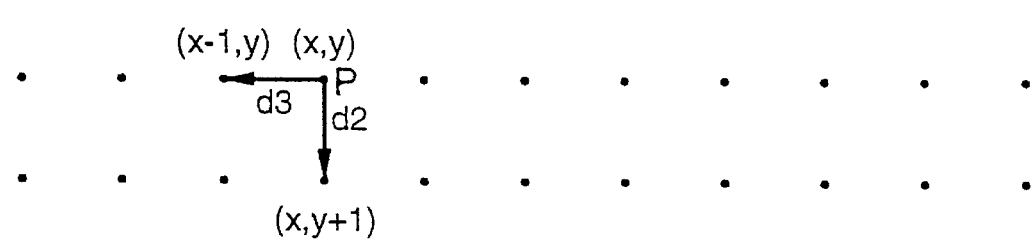
EVEN ROWS
FIG._3

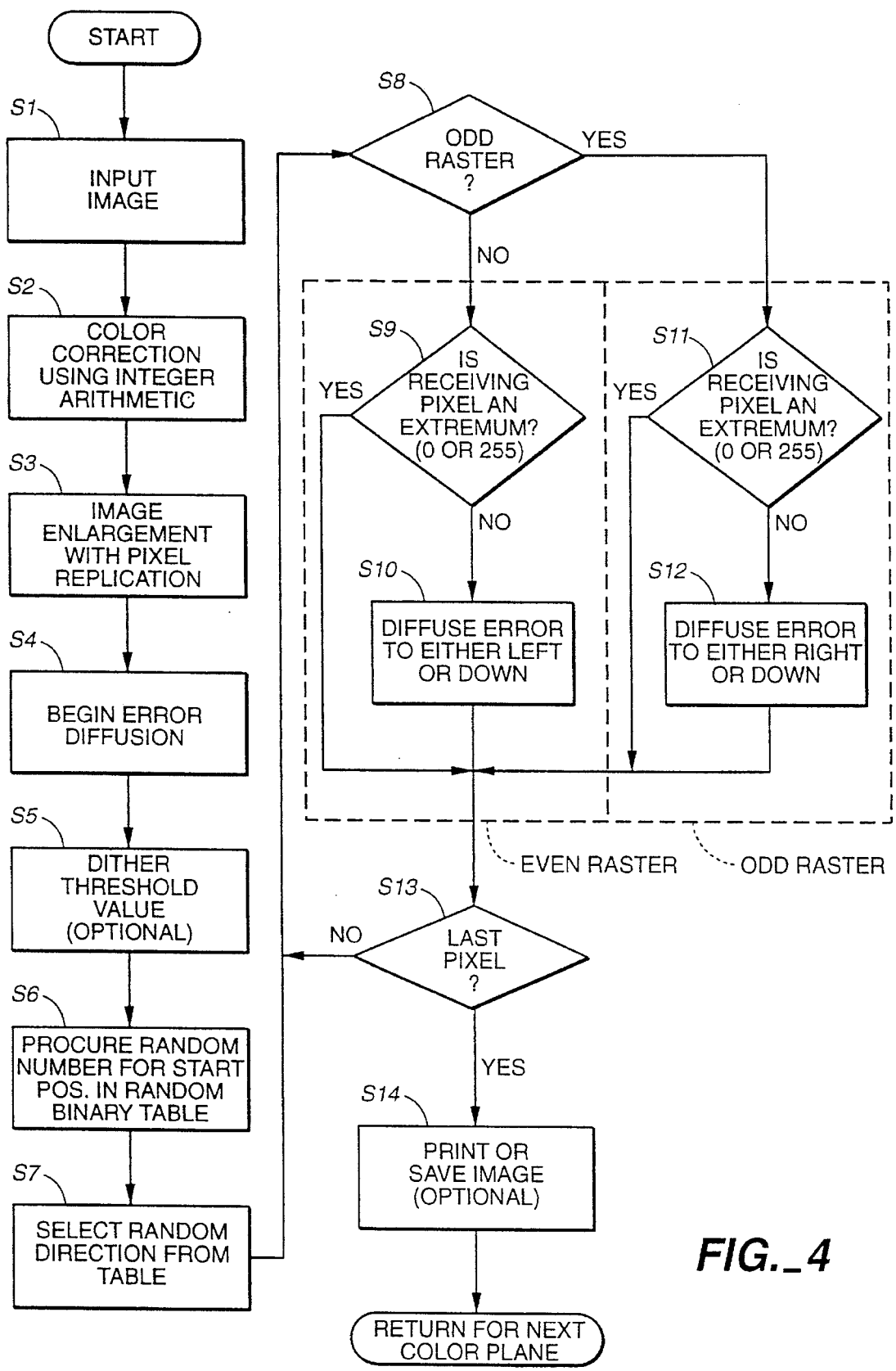
FIG._4

PROCESS FOR PROVIDING DIGITAL HALFTONE IMAGE WITH RANDOM ERROR DIFFUSION, COLOR CORRECTION AND ENLARGEMENT

BACKGROUND OF THE INVENTION

1. Field of the Invention

The present invention generally relates to methods for reproducing images by digital halftoning and, more particularly, to methods based upon digital halftoning with error diffusion.

2. State of the Art

In conventional halftone printing, picture elements (pixels) of a continuous-tone image are converted to dots whose diameters vary in size inversely with the color intensity of the corresponding area in the image. More particularly, the dots are larger where an image is darker and are smaller where an image is lighter, as shown in FIG. 1A of the accompanying drawings. Thus, conventional halftone printing processes can be described as an analog process because dot size is the analog of color intensity for individual picture elements of an original image.

To reproduce multi-color images from continuous-tone originals by conventional halftone printing, the original image is color filtered for each of four primary colors. Then the primary colors are printed sequentially while maintaining precise mechanical registration of the screens. If a scanned page is composed of several images and several text fields, those fields were mechanically stripped together to format the page.

By scanning images into a computer, the processes of page composition, image retouching and color correction can be made more flexible and more efficient. Such processes are commonly referred to as digital prepress processes. In these processes, an image is initially scanned with an optical scanner that detects intensity values for selected colors. Then, for each pixel location, the detected intensity data are converted to gray-scale values to provide a basis for image reproduction. Typically, gray-scale values are maintained in the computer by numbers that range from 0 to 255.

In digital halftone printing, dots are printed in areas that correspond with the original pixel locations. The printed dots normally are of fixed size, but their placement within the printed areas are varied in accordance with the detected gray-scale values. Thus, in images that have been produced by digital halftone printing, dot density within each printed area determines the spatial resolution and perceived color intensity (gray-scale value) of the area.

Conventional digital imaging subdivides an image into areas called super-cells. Within each super-cell, dots are clustered to form a dot pattern which is similar to that produced by the older analog process. (This is shown in FIG. 1-B of the accompanying drawings.) There are several shortcomings, however, in forming conventional digital dot patterns. One shortcoming, for example, is that visual interaction, referred to as moire patterns, can arise when dots are formed by the four or more printing inks. Avoidance of the moire patterns usually requires special digital processing techniques. Another shortcoming in forming conventional digital dot patterns is that the composite dot usually is much larger than the native dot of the image setting hardware. To overcome this shortcoming, it is usually required that the image setting equipment has high resolution (e.g., in the range of 2500 dots per inch) so that the image does not appear grainy or "noisy" and still have 256 gray scale values.

For purposes of reducing the grainy appearance of digital halftone images and for improving detail resolution, it has been suggested to use error diffusion techniques in conjunction with digital halftone printing. For example, *Digital Halftoning*, Robert Ulichney (MIT Press, 1987), 265–279, describes error diffusion techniques with perturbation. Such error diffusion techniques—sometimes referred to as stochastic screening or spatial dithering—produce a dot pattern similar to that shown in FIG. 1-C of the accompanying drawings. In that case, the dots are often said to be frequency modulated. When this process is performed for each of the primary printing colors, no special processing is required to prevent moire patterns.

To apply error diffusion techniques to digital halftone printing, gray-scale values at detected pixel locations are binary coded. The coding threshold usually is 127, i.e., halfway between the minimum and maximum gray-scale values. Then one binary number (e.g., 1) is assigned to pixel locations where detected gray-scale values are greater than 127, and another binary number (e.g., 0) is assigned to pixel locations where detected gray-scale values are 127 or less. Thus, for example, a pixel location with a detected gray-scale value of 100 would be coded as a binary "0" when binary coding for error diffusion in digital halftoning. Similarly, a pixel location with a gray-scale value of 145 would be coded as a binary "1" for this example. In monochrome printing systems based upon digital halftoning, a pixel location encoded as a binary "1" generally is black, and a pixel encoded as a binary "0" generally is white.

The above-described coding techniques for digital halftoning with error diffusion inherently result in coding errors. For example, the magnitude of the coding error resulting from binary encoding a pixel location having a gray-scale value of 100 would be 100 units away from zero units as measured by gray-scale values. Similarly, the magnitude of the coding error for binary encoding of a pixel location having a gray-scale value of 180 would be 75 units (the difference between 255 and 180) as measured by gray-scale values. There would, of course, be no coding errors for pixel locations having a gray-scale value of either 0 or 255, because those are the only two values that exactly correspond to the black and white dots, respectively.

The basic concept underlying digital halftone printing with error diffusion is to distribute, or diffuse, coding errors from the locations at which the errors arise. This concept is further discussed in an article, entitled "An Adaptive Algorithm for Spatial Grayscale", R. W. Floyd and L. Steinberg, *Proc.* SID, Vol. 17/2, pp. 75–77 (1976). Various algorithms have been proposed to accomplish error diffusion.

Although images produced by digital halftone printing with conventional error diffusion techniques may not have a grainy appearance, the printed images often contain discernible patterns. Such patterns are usually referred to as artifacts. Artifacts sometimes appear as straight lines and, other times, appear as wiggly or worm-like shapes. At still other times, artifacts have a random pebble-like appearance. Regardless of their particular form or shape, however, artifacts detract from the appearance of printed images and, therefore, limit the commercial acceptability of digital halftoning.

U.S. Pat. No. 5,051,841 to Bowers et al. provides an error diffusion process for reducing the occupance of visually-perceptible artifacts in images reproduced by digital halftone printing. According to the Bowers et al. patent, the error diffusion process includes the steps of, for selected pixel neighbors of the ith pixel in an image, diffusing the calculated error value $E_i$ of the ith pixel location to its selected neighbors as follows:

$$e_j = (w_j) E_i$$

where $e_j$ is the error value diffused to the jth pixel neighbor from the ith pixel location, where the jth pixel neighbor is randomly determined from a predetermined set of pixels neighboring the ith pixel, and where $w_j$ is a weighting factor determined for the jth pixel location. $E_T$, the total error to be diffused is defined as:

$$E_T = \sum_{J=1 \text{ to } 4} e_J$$

One problem associated with these prior art methods is that the computations necessary for performing the process are computationally intensive and, therefore, time consuming. For instance, implementation of the process in the Bowers et al. patent involves floating point arithmetic in determining the error values for each of four neighboring pixels and diffusing the calculated errors in four directions. In practice, systems that used the Bowers et al. algorithm for error value calculations employed three RISC (Reduced Instruction Set Computer) accelerator processors, with each image being divided into three bands for separate processing, one band for each RISC processor.

The prior art error diffusion processes for digital halftone printing are complicated by the fact that each pixel in an image must be separately processed. For a typical image measuring 8,000 pixels by 10,000 pixels, the image would comprise 80,000,000 pixels. If each pixel in the image were are divided into three planes of color (corresponding to cyan, magenta, and yellow), then 240,000,000 pixels would have to be processed to reproduce the image. Thus, in this example, each error diffusion step would have to be executed 240,000,000 times.

SUMMARY OF THE INVENTION

The error diffusion process of the present invention creates reproducible images that provide the illusion of a continuous-tone image without discernible artifacts. In practice, the error diffusion process of the present invention can achieve a three-fold increase in processing speed while maintaining a satisfactory image quality.

In the preferred embodiment of the present invention, the error diffusion process includes the steps of: processing an image comprising a plurality of pixels by determining intensity values for each of the pixels; and performing one weight error diffusion for each pixel. The one-weight error diffusion process includes the steps of: encoding an intensity value as a first binary value for each pixel when the determined intensity is less than a predetermined threshold value, and as a second binary value when the determined intensity is greater than the predetermined threshold value, calculating an error value corresponding to the difference between the intensity value and a predetermined value, selecting a pixel either at a first location relative to the pixel presently being processed or a second location relative to the pixel presently being processed, adjusting an intensity value of the selected pixel according to the error value, and performing the error diffusion step for a next pixel value.

The error diffusion process of the present invention can also include steps for processing the input image for color correction using integer arithmetic. Still further, the error diffusion process of the present invention can include steps for enlarging the input image through pixel replication.

Thus, as described below, the present inventions provide a color correction process, a pixel replication and enlargement process, and an error diffusion process using integer arithmetic for eliminating perceptible artifacts in enlarged images reproduced by digital halftone printing.

BRIEF DESCRIPTION OF THE DRAWINGS

The present invention can be further understood by reference to the following description and attached drawings which illustrates the preferred embodiment. In the drawings, FIGS. 1A, 1B and 1C illustrate three prior art pixel half-toning processes;

FIG. 2 is a functional block diagram of a digital halftoning system that operates according to the process of the present invention;

FIG. 3 schematically shows a field of pixels and is offered as an aid to the description of the error diffusion process of the present invention; and FIG. 4 is a flow chart of a process of providing digital halftone images with random error diffusion in accordance with the present invention.

DESCRIPTION OF THE PREFERRED EMBODIMENTS

FIG. 2 generally shows a system for digital halftone printing. The components of the system comprise an optical image scanner 5, a general purpose digital computer 7, and a digital printer 9. The illustrated components are conventional, but by employing the methods of the present invention, the components operate to eliminate the appearance of artifacts in images printed by digital halftoning with error diffusion.

In normal operation of the system of FIG. 2, the scanner 5 makes color separations of an image from a medium 13 such as a photographic transparency, a photographic print, photograph, film or a high-resolution printed original. In practice, nearly any input device capable of producing a digitized image might be used. For example, a photograph CD-ROM, modem, tape drive, disk drive or other memory device might be used in place of, or in addition to, the scanner 5.

For each of the colors separated by the system of FIG. 2, the picture elements (hereinafter "pixels") of the original image are digitized to gray-scale values. (These values correspond to color intensity.) The digitized values are provided to the digital computer 7.

Within the computer 7, the digital information can be processed with conventional graphics software so that images can be retouched, adjusted, recomposed, and so forth. The processed images are provided to the digital printer 9 for printing on to a sheet 15 by the techniques of conventional digital halftone printing.

When the system of FIG. 2 is operated by the techniques that will be described below, the digital image information that is provided to the computer 7 is binary encoded and then is operated upon to provide color correction, enlargement, and error diffusion prior to printing.

Error Diffusion

The error diffusion process of the present invention will now be described with reference to FIG. 3, wherein each dot in the field represents one pixel location on an enlarged image after optical scanning. For purposes of discussion, it will be assumed that serpentine scanning is used—that is, scanning proceeds from left to right across one row of pixels, then in the opposite direction across the next lower row, and so forth in serpentine pattern. Other scanning patterns, however, might be used; for example, a raster-type scanning pattern wherein scanning proceeds from left to right across each pixel row and sequentially, row by row, from the top to the bottom of the field.

The location of each pixel in the field in FIG. 3 can be described by cartesian coordinates; accordingly, an arbitrary pixel P is designated as having location (x, y). Because pixel P is in the interior of the field, it has eight immediately-adjacent pixel neighbors. When the pixel field is scanned, four of the immediately-adjacent neighboring pixels will be scanned before pixel P, and four will be scanned after pixel P.

Further in FIG. 3, the pixel to the immediate right of pixel P is designated by arrow $d_1$, the pixel directly below pixel P is designated by arrow $d_2$, and the pixel to the immediate left of pixel P is designated by the arrow $d_3$. Thus, the pixel designated by arrow $d_1$ can be described as having cartesian coordinates (x+1, y); the pixel designated by arrow $d_2$ can be described as having coordinates (x, y+1); and the pixel designated by arrow $d_3$ can be described as having cartesian coordinates (x-1, y). The set of directions $d_1$ through $d_3$ is herein called the direction set.

Further for purposes of discussion, the error diffusion process will be described as beginning at pixel P in FIG. 3. Also, the magnitude of the detected gray-scale value of pixel P will be described as an arbitrary number z which is between 0 and 255, inclusive. Still further, the coding error for any pixel location in the field will be referred to as $E_{x,y}$ where the subscripts identify the cartesian coordinates of the pixel.

When a pixel at a given location (x,y) has an intensity value z that is greater than a threshold value T but equal to or less than the maximum gray-scale value (i.e., 255), the magnitude of the encoding error $E_{x,y}$ will be a negative number equal to z minus 255 gray-scale units; that is, $E_{x,y}=z-255$ for $z \leq T$.

When the pixel value z is a number equal to or between 0 and the threshold value T, the magnitude of the encoding error is simply equal to the value z in gray scale units; that is, $E_{x,y}=z$ for $z \leq T$.

The threshold value T is usually a number about midway along the selected gray-scale and typically is chosen to equals 127. Although the threshold value usually is held constant, it could be randomly varied, or dithered, in a relatively narrow range about a chosen central value (e.g., 127). In that case, further randomness would be introduced into the error diffusion process that will be described below.

In the preferred embodiment of an error diffusion process, coding errors are randomly diffused from each given pixel location according to one pixel of a set of predetermined pixels. There are two sets of pixels in the exemplary embodiment, each set consisting of two predetermined, immediately-adjacent neighboring pixel locations that are scanned after the given pixel location; one pixel being in the same column and in a row below the given pixel P as shown in FIG. 3 and the other pixel which may randomly receive a coding error being in the same row as the pixel P, but either to the left or right depending on scanning direction. Which set is used depends on the raster scan direction. This is in contrast to the algorithm of the aforementioned Bowers et al. patent, wherein the coding error is divided and diffused in four directions.

More particularly, for each pixel location from which coding error is diffused, a random choice is made of where the coding error is to be diffused to two immediately-adjacent neighbors of the pixel location under consideration. For purposes of the following discussion, the directions from pixel P to three immediately-adjacent pixel neighbors either to the right, to the left, or below pixel, that are scanned after pixel P are designated as directions $d_i$, $d_j$, and $d_k$, to emphasize that the directions are randomly assigned.

In the preferred embodiment, the directions that a coding error is directed is limited to two directions, and those two directions depend on the raster direction. As stated earlier, a serpentine raster pattern is preferred. When such a pattern is employed, the coding error is diffused either down in direction $d_2$ or to the right in direction $d_1$ when the raster is moving to the right. When the raster is moving to the left, the coding error is diffused either down in direction $d_2$ or to the left in direction $d_3$. In practice, any combination of directions can be chosen as long as the coding error is directed to a pixel location not yet processed. Choosing only one of two directions in a given set, however, reduces the number of processing steps and thereby increases the speed of the process.

For purposes of providing random assignments within a direction set, it is usually convenient to use a sequencing look-up table that contains approximately several hundred random numbers. Thus, without occupying computer memory and processing capabilities with an extensive array of random numbers, the above-described process uses only several hundred random numbers each of which correspond to a direction. Then, to reduce the likelihood of creating artifacts that might result from the small set of random numbers being repeatedly used in a recurrent pattern, a random number corresponding to an arbitrary location in the random number table is generated at the beginning of each raster line. In practice, the process is begun at a random location in the table and, thereafter, each random number is serially read from the table to determine the direction in which the coding error is directed.

Because the coding error is moved in only one of two directions during any one raster scan, the random number look-up table is essentially a table of randomly selected binary values. In practice, the reduced set of directions the error values can be moved contributes to the speed of the processing.

Further in the preferred embodiment of the error diffusion process, after direction assignments are randomly determined, the first direction $d_i$ is assigned and one weight is assigned to the randomly selected direction. In other words, all of the coding error is diffused to only one location, thereby eliminating the need for division or other computationally intensive procedures. Although one weight diffusion is computationally inexpensive, workers in the art of error diffusion have previously assumed that this procedure would provide unacceptable results in terms of the creation of artifacts. (See, for example, page 268–270 of the Ulichney text, supra.)

As a result of coding error being diffused from one pixel location to a (randomly) selected location, the gray-scale values of the selected pixel location is increased or decreased by the magnitude of the coding error. For example, after error diffusion from pixel P at location (x,y), the gray-scale values imputed to the location (x+1,y) would be the detected gray-scale value for that location plus the diffused coding error assuming, of course, that the location (x+1,y) has been randomly selected to receive the error. On the other hand, if the alternative location (x,y+1) was randomly selected, the gray-scale value input to the pixel location would be the detected gray-scale value for that pixel plus the coding error. In practice, a table of coding errors is generated, which is then accessed when necessary.

To even further enhance the speed of the error diffusion process, the procedures for diffusing coding error values to individual pixels can be divided according to the raster direction. For example, if the raster scan is proceeding to the right, a certain program code section can be used. Conversely, if the raster is proceeding to the left, a separate program code section can be used. This method requires the execution of fewer computer instructions and tests for each pixel in the row. This procedure is illustrated in FIG. 4, explained below.

Before proceeding with an explanation of FIG. 4, however, it should be understood that the above described error diffusion process continues for each successively scanned pixel location. Thus, as a result of the error diffusion process, the gray-scale value for any one pixel location will reflect error diffusion from its neighboring pixels. It also should be understood that the diffusion process can be suspended, thereby producing better preserved edges, when a monochromatic zone, such as a white zone or any other zone where the pixel values in a given color plane do not vary substantially, is detected. This suspension technique is satisfactory because the diffusion process tends to blur the edges of brightly contrasting zones such as text by carrying coding errors beyond the border lines. In practice, error diffusion is suspended, which is to say that an edge is recognized, whenever the pixel value of the pixel receiving the error is an extremum value (either 0 or 255).

For multi-color halftone printing, a field such as shown in FIG. 3 usually is sequentially scanned with different color filters. Alternatively, the field can be scanned once with each pixel element having multiple exposures using different filters. Then, for each of the selected colors in each the pixel locations in the scanning field, binary coding errors are diffused as described above. Then, multi-color images without discernible artifacts are printed by conventional digital halftone printing procedures. For either monochrome or multi-color halftone printing, the above described procedures can be summarized in the flow chart shown in FIG. 4.

As shown in the flow chart of FIG. 4, an image is scanned at step S1. Thereafter, in step S2, color correction using integer arithmetic operations is performed. Then, in step S3, the image is enlarged using pixel replication. The error diffusion process is then begun at step S4 wherein the threshold value T may be varied, or dithered at step S5, to increase the randomness of the error diffusion. Thereafter at step S6, a random number is generated or otherwise procured for selecting an arbitrary position in a random number table. The process then proceeds to step S7 where a random number is selected to assign a direction to the error diffusion. The random numbers are sequentially read from the table beginning at the randomly chosen location in the table.

In preferred practice, a serpentine raster pattern is used. Therefore, at step S8 a determination is made of whether the raster row is an even row or an odd row. In the event that the row is odd, steps 11 and 12 are performed. Then, after the direction $d_1$ or $d_2$ is determined, the pixel at that location is tested to determine if it is an extremum (e.g., a black or white pixel). If the pixel is black or white, no error is passed to it; otherwise, error is passed.

If the raster row is even, steps 9 and 10 are performed. In that case, the direction $d_2$ or $d_3$ is first determined and then the pixel at that location is tested for an extremum. If the pixel is not an extremum, the error is passed as appropriate.

In practice, the file of pixels being processed is often too large to read into computer memory all at one time. In that event, the process depicted in FIG. 4 is performed on a subset of rows, usually referred to as a band. Typically, when the last pixel in a given band is encountered the results for that band are either electronically stored or printed. In any event, the process in FIG. 4 is performed for each of the color planes that make up an image.

Color Correction

The process of color correction is typically done using floating point arithmetic in previous systems. Because the arithmetic operations involve division and multiplication, the color correction process was computationally intensive, adding a large number of processing steps, thereby substantially slowing down the image processing. However, as described above, the use of integer mathematics has been discovered to be sufficient to achieve faithful reproduction of images.

Enlargement

Often it is appropriate to change the size of the scanned-in image. Previously for zooming or enlargement, systems utilize complicated image enlargement systems. Generally, the prior systems spatially separated pixels and filled in the spaces between existing pixels with newly created pixels thereby enlarging the image. The intensity values with the newly created pixels were interpolated or found through averaging adjacent pixels. For instance, if an image size were tripled, two new pixels would appear between each existing pixel on a raster line. The values of these new pixels would be weighted according to their proximity to the original pixels through interpolation or averaging. A problem associated with this form of enlargement is that it using floating point mathematics. In other words, the averaging procedure requires several additional steps for division operations to achieve the weighted values of the individual, newly created pixels. This, like the color correction, is computational intensive and greatly slows down the system.

The above-described process overcomes these drawbacks by enlarging the image through simple pixel replication. To enlarge an image in both vertical and horizontal directions, a single pixel is replicated a the number of times corresponding to the enlargement ratio. For instance, if the image is to be doubled in size, a single pixel will be replicated once to the left, once directly below, and once immediately adjacent the new pixel immediately below the original pixel. This results in a four pixel square of a uniform gray-scale value. Although it would seem that such simple replication methods would result in a mosaic image wherein lines would have the appearance of a stepped or jagged edge, this drawback is greatly ameliorated by using the process of error diffusion, as explained above.

Thus, the unique combination of the above-described error diffusion process and simple pixel replication can lead to a three-fold decrease in processing time while simultaneously reducing hardware requirements.

Although the preferred embodiments of the process of the present invention have been described, those skilled in the art will appreciate that additions, modifications, substitutions and deletions not specifically designed in the foregoing may be made without departing from the spirit and scope of the present invention. For example, diffusion directions can be chosen other than the above discussed directions and it is not necessary for the error to be diffused only to immediately adjacent pixel neighbors. Also, the process has application outside printed image reproduction. Accordingly, the above described embodiment should be regarded as illustrative rather than restrictive, and it should be appreciated that workers skilled in the art may make variations in those embodiments without department from the present invention as defined by the following claims.

What is claimed is:

1. A digital halftoning process comprising the steps of:

processing an image comprising a plurality of pixels by determining intensity values for each of the plurality of pixels;

performing one weight error diffusion, the one weight error diffusion including the steps of:

encoding an intensity value as a first binary value for each pixel when the determined intensity is less than a predetermined threshold value, and as a second binary value when the determined intensity is greater than the predetermined threshold value, calculating an error value corresponding to the difference between the intensity value and a predetermined value, randomly selecting a pixel either at a first location relative to the pixel presently being processed or a second location relative to the pixel presently being processed by sequentially outputting binary values from a table of a limited number of randomly generated binary values, wherein the step of randomly selecting a first or a second location includes using a random number corresponding to an arbitrary address in the table of binary values to begin an output sequence of binary values, and adding the error value to an intensity value of the selected pixel; and performing one weight error diffusion for a next pixel value following a raster scan pattern.

2. A process according to claim 1, wherein the calculating step includes creating a table of error values corresponding to the plurality of pixels for adjusting the intensity values thereof.

3. A process according to claim 1, wherein, when the image is viewed as pixels on a plurality of raster lines wherein the topmost first, third and other odd numbered raster lines are referred to as "odd raster lines" and the second, fourth, sixth and other even numbered raster lines are referred to as "even raster lines", the first location is to the left of a pixel currently being processed when on an even raster line and to the right of the pixel currently being processed when on an odd raster line.

4. A process according to claim 1, wherein, when the image is viewed as pixels on raster lines, the second location is below and immediately adjacent to a pixel current being processed.

5. A process according to claim 1, wherein the random number is selected at a beginning of a next raster line following a raster scan pattern.

6. A digital halftoning process comprising the steps of:

processing an image comprising a plurality of pixels by determining intensity values for each of the plurality of pixels; and performing one weight error diffusion, the one weight error diffusion including the steps of:

encoding an intensity value as a first binary value for each pixel when the determined intensity is less than a predetermined threshold value, and as a second binary value when the determined intensity is greater than the predetermined threshold value, calculating an error value corresponding to the difference between the intensity value and a predetermined value, randomly selecting a pixel either at a first location relative to the pixel presently being processed or a second location relative to the pixel presently being processed by sequentially outputting binary values of a table of a limited number of randomly generated binary values, wherein the step of randomly selecting a first or a second location includes using a random number corresponding to an arbitrary address in the table of binary values to begin an output sequence of binary values, and adding the error value to an intensity value of the selected pixel; and performing the error diffusion step for a next pixel value.

7. A process according to claim 6, wherein the calculating step includes creating a table of error values corresponding to the plurality of pixels for adjusting the intensity values thereof.

8. A process according to claim 6, wherein, when the image is viewed as pixels on a plurality of interposed raster lines wherein the topmost first, third and other odd numbered raster lines are referred to as "odd raster lines" and the second, fourth, sixth and other even numbered raster lines are referred to as "even raster lines", the first location is to the left of a pixel currently being processed when on an even raster line and to the right of the pixel currently being processed when on an odd raster line.

9. A process according to claim 6, wherein, when the image is viewed as pixels on raster lines, the second location is below and immediately adjacent to a pixel current being processed.

10. A process according to claim 6, wherein the random number is selected at a beginning of a next raster line following a raster scan pattern.

* * * * *